United States Patent [19]

Duderstadt

[11] Patent Number: 5,498,484
[45] Date of Patent: Mar. 12, 1996

[54] THERMAL BARRIER COATING SYSTEM WITH HARDENABLE BOND COAT

[75] Inventor: Edward C. Duderstadt, Fairfield, Ohio

[73] Assignee: General Electric Company, Cincinnati, Ohio

[21] Appl. No.: 520,013

[22] Filed: May 7, 1990

[51] Int. Cl.$^6$ .................................................. C03C 27/02
[52] U.S. Cl. ..................... 428/633; 428/632; 148/240; 148/514
[58] Field of Search ...................... 428/623, 632, 428/633; 416/241 B; 148/240, 514

[56] References Cited

U.S. PATENT DOCUMENTS

| | | | |
|---|---|---|---|
| 4,055,705 | 10/1977 | Stecura et al. | 428/633 |
| 4,321,310 | 3/1982 | Ulion et al. | 428/633 |
| 4,321,311 | 3/1982 | Strangman | 428/633 |
| 4,335,190 | 6/1982 | Bill et al. | 428/623 |
| 4,399,199 | 8/1983 | McGill et al. | 428/639 |
| 4,485,151 | 11/1984 | Stecura | 428/656 |
| 4,615,865 | 10/1986 | Duvall et al. | 420/588 |
| 4,639,399 | 1/1987 | Aprigliano | 428/623 |
| 4,753,686 | 6/1988 | Company et al. | 148/4 |
| 4,861,618 | 8/1989 | Vine et al. | 427/34 |
| 4,880,614 | 11/1989 | Strangman et al. | 428/633 |
| 4,885,213 | 12/1989 | Miyamoto et al. | 428/632 |
| 4,889,776 | 12/1989 | Priceman | 428/629 |
| 4,897,315 | 1/1990 | Gupta | 428/610 |
| 4,900,640 | 2/1990 | Bell et al. | 428/633 |

Primary Examiner—Donald P. Walsh
Assistant Examiner—Daniel Jenkins
Attorney, Agent, or Firm—Andrew C. Hess; David L. Narciso

[57] ABSTRACT

A thermal barrier coating system for high temperature nickel-based and cobalt-based superalloys includes a hardenable metallic coating on the substrate and a ceramic topcoat. The metallic coating is preferably a gamma/gamma prime hardenable nickel-based superalloy, and the ceramic topcoat is preferably zirconium oxide having from about 6 to about 20 percent yttrium oxide or from about 15 to about 40 percent cerium oxide. Optionally, there may be provided between the hardenable metallic layer and the ceramic topcoat an intermetallic coating such as a nickel aluminide.

27 Claims, 2 Drawing Sheets

5,498,484

THERMAL BARRIER COATING SYSTEM WITH HARDENABLE BOND COAT

BACKGROUND OF THE INVENTION

This invention relates to nickel-based superalloys, and, more particularly, to thermal barrier coating systems that protect such superalloys from oxidation and corrosion during operation.

One of the most demanding materials applications in current technology is found in turbine blades used in aircraft jet engines. The higher the operating temperature of an engine, the greater its efficiency, and the more power it can produce from each gallon of fuel. There is therefore a strong incentive to operate such engines at as high a temperature as possible. One critical limitation on the operating temperatures of engines is the materials used in the hottest regions of the engine, such as gas turbine blades and vanes.

There has been an extraordinary amount of effort over the past 40 years to develop materials that can be used in high temperature engine applications. The currently most popular and successful of such materials are the nickel-based superalloys, which are alloys of nickel with additions of a number of other elements such as, for example, chromium, cobalt, aluminum, tantalum, yttrium. The compositions of these superalloys are carefully engineered to maintain their strength and other desirable properties even during use at the high temperature of engine operation, which is in the neighborhood of 2000° F. or more.

High operating temperatures can also be achieved by other techniques not related directly to the alloy compositions used in the components. For example, control of grain structures and use of single crystals can result in improved properties. Cooling passages may be provided in the components, and cooling air passed through them.

In another approach that is the primary focus of the present application, an insulating layer of a low thermal conductivity material, such as a ceramic, is deposited upon the component. This insulating layer, termed a thermal barrier coating or TBC, creates a thermal gradient from the surface of the superalloy component to the environment, so that the metallic component and the gas turbine may be operated in hot combustion gas at a higher temperature than otherwise would be possible. The insulating layer must protect the metallic structure from heat, be adherent to the superalloy substrate, and remain adherent through many cycles of heating to the operating temperature and then cooling back to ambient temperature when the engine is turned off. Because ceramics and metals have different coefficients of thermal expansion, cycles of heating and cooling tend to cause the ceramic coating to crack and spall off, which results in the superalloy being overheated in the area of the defect.

Ceramic coatings can act as thermal insulation for superalloy parts, but considerable care must be taken to ensure that the coating adheres well to the surface of the superalloy part, and remains adherent through many thermal cycles. To improve the adhesion and maintenance of adhesion of the ceramic coating, metallic bond coatings have been developed, and the combination of the ceramic coating, the bond coating, and other constituents that might be present is known as a thermal barrier coating system. The general concept behind the bond coatings is that they provide a highly textured surface to increase the adherence of the ceramic coating when the ceramic coating is deposited by the plasma spray method. For thermal barrier coating systems where the ceramic coating is deposited by the physical vapor deposition process, the bond coating should have a composition conducive to the formation of an adherent aluminum oxide scale on its surface prior to the deposition of the ceramic top coat.

In one approach to a thermal barrier coating system, a bond coat layer of metallic MCrAlY, where M is iron, nickel, or cobalt, is first deposited upon the superalloy substrate by physical vapor deposition. The surface of the bond coat is oxidized to produce a layer of protective aluminum oxide overlying the bond coat. The ceramic coating is deposited on top of the aluminum oxide by a physical vapor deposition process. If the ceramic coating is properly applied, it may have the form of separated columns extending perpendicular to the surface of the coating and the part, such as illustrated in FIG. 1 of each of U.S. Pat. Nos. 4,321,310 and 4,321,311. In another approach, a bond coat layer of metallic MCrAlY is first deposited upon the substrate by a plasma spray process. The ceramic top coating is deposited on top of the bond coating, also by a plasma spray process.

While such approaches may be useful, there is a continuing need for further improvements in thermal barrier coating systems. The present invention fulfills this need, and further provides related advantages.

SUMMARY OF THE INVENTION

The present invention provides a thermal barrier coating that utilizes the proven prior approach of a ceramic topcoat and an underlying bond coat layer that improves adherence of the topcoat to the substrate. The thermal barrier coating system of the invention results in improved thermal cycling performance through a modification to the underlying bond coat layer.

In accordance with the invention, a superalloy article having a thermal barrier coating thereon comprises a substrate made of a first superalloy; and a thermal barrier coating on the substrate, the thermal barrier coating including a metallic bond coat upon the substrate, the bond coat being a layer of a second superalloy that is hardenable by heat treatment, and a ceramic topcoat upon the bond coat. The two superalloys may be the same or of different compositions, and may be either a nickel-based or a cobalt-based superalloy.

In a variation of this embodiment, a layer of a nickel aluminide intermetallic compound is deposited overlying the hardenable bond coat. Aluminides, as distinguished from metals, are ordered structures including aluminum and another metal. If the bond coat is deposited by a technique such as physical vapor deposition that produces a relatively smooth upper surface on the bond coat and thence on the nickel aluminide, the upper surface of the nickel aluminide is then oxidized to form an aluminum oxide layer that protects the substrate from oxidation and corrosion, prior to deposition of the ceramic topcoat. If the bond coat is applied by a technique such as plasma spray that results in a rough upper surface, no further treatment is required.

In accordance with this aspect of the invention, a superalloy article having a thermal barrier coating thereon comprises a substrate made of a superalloy; and a thermal barrier coating on the substrate, the thermal barrier coating including a metallic bond coat overlying the substrate, the bond coat being a hardenable superalloy with a thickness of from about 0.001 to about 0.005 inches, and having an upper surface that has an average surface roughness of at least about 400 microinches, a layer of a nickel aluminide intermetallic compound overlying the bond coat and having a thickness of from about 0.001 to about 0.003 inches, and a ceramic topcoat overlying the layer of nickel aluminide intermetallic compound.

The present invention also extends to a process for preparing the coated article of the invention. Thus, a process for preparing a superalloy article having a thermal barrier coating thereon comprises furnishing a substrate made of a first superalloy; depositing upon the substrate a bond coat of a heat-treatable second superalloy; and depositing a ceramic topcoat overlying the bond coat. As with the article, the process may be modified by adding the additional step, after the step of depositing a bond coat and before the step of depositing a ceramic topcoat, of depositing upon the surface of the substrate a layer of a nickel aluminide. If this step is added, the process may be modified yet further by including the additional step, after the step of depositing the layer of nickel aluminide and before the step of depositing a ceramic top coat, of oxidizing the surface regions of the nickel aluminide layer to form an aluminum oxide layer, in the event that the bond coat is deposited by physical vapor deposition or other technique that produces a relatively smooth surface.

The thermal barrier coating system of the invention is useful in relation to a variety of superalloys, both nickel-based and cobalt-based, and no other limitation is known as to the substrate. The selection of a hardenable, heat treatable bond coat is significant, as previously it has been thought that the metallic bond coat should be relatively soft and easily deformed. It was thought that the bond coat was necessarily compliant to reduce the thermally induced strain gradient between the substrate and the ceramic topcoat during thermal cycling. However, it has now been demonstrated that creep of a soft bond coat can accelerate the delamination and spalling of the ceramic topcoat, leading to its premature failure. A hardenable bond coat has the advantage of prolonging the life of the thermal barrier coating system by reducing creep of the bond coat.

The hardenable bond coat can be applied in any acceptable manner. However, some hardenable bond coat candidate materials are so complex that they cannot be deposited by techniques such as physical vapor deposition, and require the use of low pressure plasma spray deposition of previously alloyed powder. Plasma spray deposition leads to a relatively rough surface of the bond coat, but this has not been found to be injurious to the life of the thermal barrier coating system where proper subsequent procedures are followed.

The ceramic topcoat, preferably zirconium oxide modified with about 8 percent by weight of yttrium oxide, is deposited upon the surface of the bond coat by any suitable technique, preferably plasma spray or physical vapor deposition. Where the surface of the bond coat is smooth, as a result of the mode of deposition or mechanical smoothing, the physical vapor deposition approach may be used, resulting in formation of columnar grains of the ceramic. The columnar ceramic grains have their long axes perpendicular to the surface of the bond coat and the substrate, improving the resistance of the topcoat to spalling during thermal cycling of the protected substrate. However, where the surface of the bond coat is rougher, as when it is deposited by plasma spray and not smoothed, the columnar grains of ceramic topcoat do not reproducibly grow. In this case, the faster and less expensive plasma spray technique is preferred for the deposition of the ceramic topcoat, which then has a more equiaxed grain structure.

An important modification to this approach is to deposit a layer of nickel aluminide intermetallic compound over the bond coat, and optionally to oxidize its upper surface, prior to depositing the ceramic topcoat. A thin coating of nickel aluminide is preferably deposited by pack cementation, or other technique, onto the surface of the previously deposited hardenable metallic bond coat. The nickel aluminide is an intermetallic material, preferably being near the equiatomic composition wherein equal numbers of nickel and aluminum atoms are present. Small amounts of modifiers may be present in the nickel aluminide, as a few percent of chromium or smaller amounts of tantalum, titanium, or cobalt. If the bond coat was deposited by physical vapor deposition or other technique producing a smooth surface, the nickel aluminide may be oxidized to convert the uppermost portion to aluminum oxide, which affords protection to the underlying material, including the substrate, against oxidation and corrosion during use, and also aids in bonding the ceramic topcoat to the bond coat and thence to the substrate. The oxidizing treatment is optional where the top coat is applied by plasma spraying.

With many prior thermal barrier coating systems, the aluminum content of the bond coat is increased to the 8–10 weight percent range, to provide aluminum for the formation of an aluminum oxide surface layer. Increasing the aluminum content to such a level renders the bond coat nonhardenable by the gamma/gamma prime reaction, resulting in the soft bond coat previously thought to be desirable. In the preferred approach of the present invention, the aluminum content of the bond coat is maintained low, typically about 5–7, and most preferably about 6–7 weight percent, so that the bond coat may be hardened by gamma/gamma prime precipitation. Any extra aluminum required for oxidation and corrosion protection is provided in a separate surface layer of nickel aluminide intermetallic.

The present approach offers important advantages over the thermal barrier coating approaches of the past. The primary advantage is that the use of the hardenable bond coat reduces the creep of the bond coat during high temperature exposure and during thermal cycling, thereby reducing the magnitude of the compressive stress in the ceramic topcoat upon cooling of the article to room temperature after use, which stress can ultimately lead to spalling of the ceramic topcoat. Where it is used, the intermetallic nickel aluminide coating and its oxidized aluminum oxide surface may be made quite thin, but still provide excellent resistance to both corrosion and oxidation damage of the bond coat and the substrate, while aiding in attaining a good bond between the topcoat and the bond coat, and thence the substrate.

Other features and advantages of the invention will be apparent from the following more detailed description of the preferred embodiment, taken in conjunction with the accompanying drawings which illustrate, by way of example, the principles of the invention.

DETAILED DESCRIPTION OF THE PREFERRED EMBODIMENT

Figure 1:
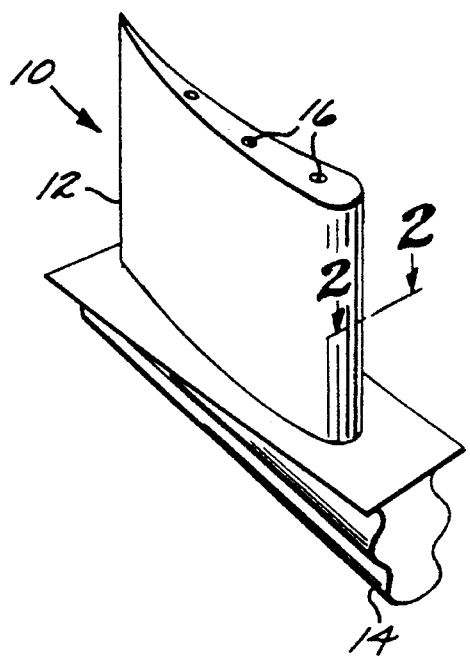
FIG. 1 is a perspective view of a turbine blade having a thermal barrier coating.

The thermal barrier coating system of the invention is preferably used with nickel-based superalloys, in applications such as a jet engine gas turbine blade 10 illustrated in FIG. 1. The blade 10 may be formed of any suitable superalloy such as Rene 80, a well known nickel-based superalloy which has a nominal composition of 14 weight percent chromium, 9.5 weight percent cobalt, 5 weight percent titanium, 4 weight percent tungsten, 4 weight percent molybdenum, 3 weight percent aluminum, 0.17 weight percent carbon, 0.06 weight percent zirconium, 0.015 weight percent boron, and the balance nickel.

Such a blade 10 includes an airfoil section 12 against which hot combustion gases are directed when the engine operates, and whose surface is subjected to severe oxidation and corrosion attack during service. If the surface of the airfoil section 12 is not protected against oxidation and corrosion in some fashion, it will normally last at most only a few cycles of operation. The airfoil section 12 is anchored to a turbine disk (not shown) through a root section 14. In some cases, cooling passages 16 are present in the airfoil section 12, through which cool bleed air is forced to remove heat from the blade 10. The blade 10 is normally prepared by a casting and solidification procedure well known to those skilled in the art, such as investment casting or, more preferably, directional solidification or single crystal growth.

Figure 2:
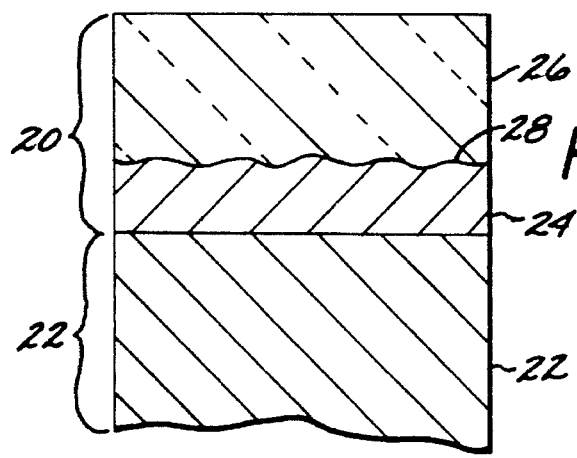
FIG. 2 is an enlarged sectional view of the turbine blade of FIG. 1, taken along lines 2—2.

According to the present invention, the airfoil section 12 is protected by a thermal barrier coating system 20, as illustrated in detail in FIG. 2, which depicts an enlargement of a section through the surface portion of the blade 10. The nickel-based superalloy of the blade 10 forms a substrate 22 upon which and over which the thermal barrier coating system 20 is deposited.

A key objective of the thermal barrier coating system approach is to interpose a ceramic insulation layer between the hot combustion gases of the environment, and the substrate of the blade. The ceramic insulation layer acts much like other more common types of insulation, preventing the high temperature gases from contacting the metallic substrate. Alternatively stated, the ceramic layer creates a thermal gradient between the environment and the metal of the blade. Where present, the bleed air flowing through the cooling air passages 16 maintains the interior of the blade 10 at a reduced temperature as compared with the combustion gas environment, thereby permitting the blade 10 to be operated at a higher combustion gas temperature than would otherwise be possible.

Experience has shown that a ceramic insulation layer cannot be deposited directly upon the metallic substrate, in part because the adhesion between the two different materials is not sufficiently great, and in part because the difference in thermal expansion of the ceramic and metal causes the ceramic to crack and spall off during thermal cycling. That is, when the blade is heated and cooled as the engine is turned on, operated at various power levels, and turned off, the difference in thermal expansion coefficients causes cracks to develop in the brittle ceramic topcoat. The cracks propagate through the ceramic, and eventually flakes of the ceramic topcoat are separated from the substrate in the affected regions, a process known in the art as spalling. The exposed metallic substrate in spalled regions is then rapidly degraded by the hot gases. After spalling occurs in a region of a blade, its life before failure is usually significantly reduced.

To ensure good adhesion and to avoid spalling failures, the thermal barrier coating system 20 includes a metallic bond coat 24 between ceramic topcoat 26 and substrate 22. The preferred bond coat of the invention is a layer of a hardenable nickel-based superalloy. Suitable hardenable superalloys for use as the bond coat 24 include PS6MY, having a nominal composition of 9 weight percent chromium, 6 weight percent aluminum, 4 weight percent cobalt, 1.5 weight percent molybdenum, 5 weight percent tantalum, 4.5 weight percent tungsten, 1.5 weight percent rhenium, 0.9 weight percent hafnium, 0.3 weight percent yttrium, 0.05 weight percent carbon, 0.015 weight percent boron, and the balance nickel; and NC6' having a composition of 10 weight percent cobalt, 18 weight percent chromium, 6.5 weight percent aluminum, 0.3 weight percent yttrium, 6 weight percent tantalum, 2 weight percent rhenium, 0.5 weight percent hafnium, 1 weight percent silicon, 0.015 weight percent zirconium, 0.015 weight percent boron, balance nickel totalling 100 percent. These superalloys are hardenable by the proper heat treatment through the formation of a gamma/gamma prime microstructure, a familiar hardening reaction well known to those skilled in the metallurgical art for hardening components, but heretofore not used to harden bond coats.

After hardening, the superalloy bond coat 24 is more resistant to creep deformation than would be an unhardened or unhardenable bond coat. Because the function of the bond coat is to act as an intermediary between the metallic substrate and the ceramic topcoat, it has been generally believed in the art that a high degree of creep is desirable, to avoid residual strains during thermal cycling. However, it has now been discovered that too high a creep rate and magnitude of creep deformation can increase the stress-free temperature of the bond coat, resulting in greater compressive stress in the ceramic top coat upon cooling to room temperature, thus increasing the tendency to spalling of the ceramic top coat. The present invention therefore takes a contrary approach to the teachings of the art, and provides a hardened bond coat 24 that resists the shifting of the stress free temperature of the bond coat. This departure from the teachings of the art has resulted in improved thermal cycling behavior of the coated substrates, and increased resistance to spalling.

Substrates protected by the coating of the invention are prepared by the following procedure. After the substrate 22 is cast (or formed) to shape, the metallic bond coat 24 is deposited over the substrate 22. The bond coat 24 may be deposited by any suitable approach. However, the suitability of some approaches is limited by the complexity of the bond coat material. For example, most gamma/gamma prime hardenable superalloys, such as PS6MY and other preferred alloys, contain so many elements and have such a complex microstructure that they cannot be readily deposited by physical vapor deposition using presently available technology. The preferred approach for depositing these alloys for the bond coat 24 is plasma spray deposition, wherein prealloyed powders of the correct composition of the bond coat are fully or partially melted in a plasma created in a spray gun. This technique is well known to those skilled in the art. The sprayed bond coat 24 produced by this technique can be made of any desired thickness, preferably about 0.001 to about 0.005 inches thick, but its surface 28 is typically not smooth. The surface 28 ordinarily has a surface roughness, as measured by a profilometer, of at least about 400 microinch average amplitude. This surface roughness is desirable in assisting the bonding of the ceramic topcoat 26 to the bond coat 24 and thence to the substrate 22.

The ceramic topcoat 26 is deposited overlying the bond coat 24. The ceramic topcoat 26 is applied by any suitable procedure, but plasma spray deposition is preferred. The same general approach as disclosed for depositing the bond coat is employed to deposit the ceramic topcoat. The preferred ceramic for the topcoat 26 is zirconium oxide stabilized with about 6 to about 20 weight percent yttrium oxide or about 15 to about 40 weight percent cerium oxide. Most preferably, the ceramic topcoat 26 is zirconium oxide with about 8 percent by weight of yttrium oxide, applied by plasma spraying. The preferred thickness of the topcoat 26 is from about 0.005 to about 0.020 inches, most preferably 0.010 inches. The topcoat produced by this process is a generally equiaxed ceramic exhibiting both melted and unmelted regions as viewed by light microscopy.

The temperature of deposition of the topcoat 26 plays a role in attaining good life of the thermal barrier coating system. The substrate should be heated to a temperature of from about 200° to about 600° F. during the deposition, with the most preferred temperature being about 400° F.

Alternatively, other approaches such as physical vapor deposition may be used to deposit the topcoat 26, in an effort to attain columnar grains whose column axis is perpendicular to the surface of the substrate 22 and the bond coat 24. See, for example, U.S. Pat. Nos. 4,321,310 and 4,321,311, whose disclosures are incorporated herein by reference. However, it is difficult to attain a columnar grain microstructure when the surface of the bond coat 24 is rough in the manner produced by plasma spraying. Application of the ceramic topcoat over such a rough topcoat by the faster and more economical technique of plasma spraying remains favored. If the columnar grain structure of the ceramic topcoat 26 is desired, one of two alternative approaches may be followed. In the first, the bond coat 24 may be deposited by a technique that produces a relatively smooth surface, such as physical vapor deposition, and the topcoat deposited onto this smooth surface. In the other, the bond coat is deposited by a technique that produces a rough surface, such as plasma spray deposition, the rough surface is smoothed by mechanical grinding or the like, and the topcoat is deposited onto this smoothed surface. Properly controlled deposition of the ceramic topcoat onto a smooth surface results in a columnar structure.

After the bond coat 24 is applied, but before subsequent processing, the substrate and deposited bond coat are heat treated to effect precipitation of strengthening precipitates in the bond coat by the gamma/gamma prime reaction. The preferred heat treatment varies according to the composition of the bond coat. For the preferred PS6MY bond coat, a heat treatment of 2 hours at 2200° F. produces the best thermal cycling results of the finished superalloy article. If the substrate is to be heat treated, a heat treatment of 4 hours at 1975° F. may be desirable. In a typical commercial practice, the bond coat 24 would simply be heat treated with the same heat treatment as the substrate.

Figure 3:
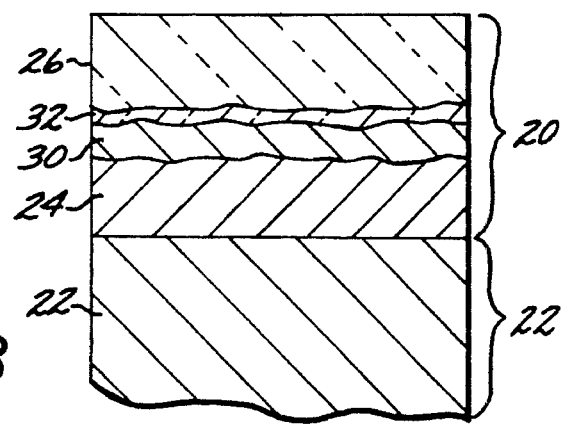
FIG. 3 is an enlarged sectional view similar to that of FIG. 2, showing another embodiment of the coating of the invention.
Figure 4:
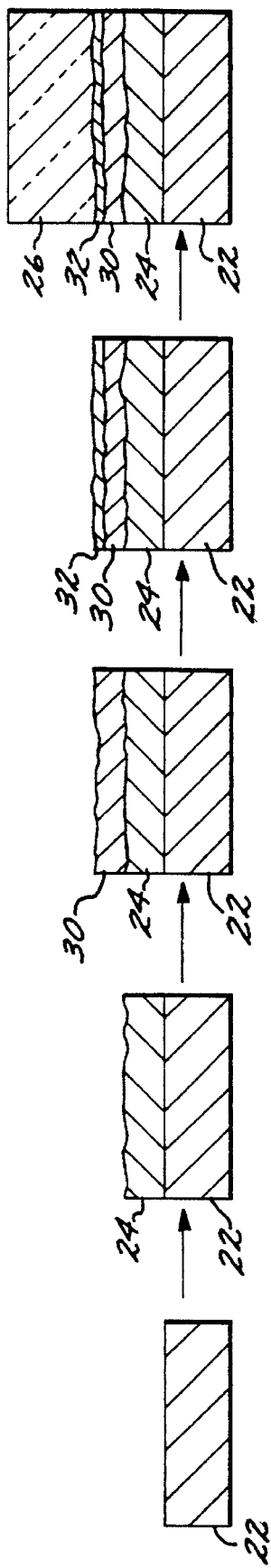
FIG. 4 is a pictorial flow diagram for a process of applying the coating of FIG. 3 to the turbine blade of FIG. 1, showing the surface structure of the blade at each stage of manufacture.

A variation of this basic approach of the invention is illustrated in FIG. 3, and by the process flow diagram of FIG. 4. In this alternative approach, after the hardenable bond coat 24 is deposited, a layer 30 of a nickel aluminide intermetallic compound is formed over the bond coat 24. Then, where the top coat 26 is to be deposited by physical vapor deposition, the upper portion of the nickel aluminide layer 30 is oxidized to produce an aluminum oxide protective layer 32.

The layer 30 preferably is the unmodified intermetallic compound NiAl. The nickel aluminide is approximately equiatomic in nickel and aluminum. That is, the nickel aluminide has about equal numbers of nickel and aluminum atoms. (This composition is about 31.5 percent by weight aluminum, balance nickel.) Small compositional modifications may be made to the nickel aluminide, such as the addition of a few percent of chromium, tantalum, titanium, cobalt, or other alloying element. Such modified compositions are within the scope of the term "nickel aluminide" as used herein. The modifications may be made as intentional alloying additions to the nickel aluminide, or may diffuse into the nickel aluminide during its formation on the surface of the superalloy bond coat and the substrate, as elements diffuse outwardly into the nickel aluminide layer.

The nickel aluminide used for the layer 30 is to be clearly distinguished from metallic MCrAlY bond coats previously used in the art. Such bond coats are disclosed in U.S. Pat. Nos. 4,321,310 and 4,321,311, for example. A typical MCrAlY alloy of the art is disclosed in Example 1 of the '310 patent and Example 1 of the '311 patent. This MCrAlY alloy has about 12.5 weight percent aluminum and 0.3 weight percent yttrium. Its composition is not close to the preferred intermetallic nickel aluminide composition of the present invention having about 31.5 weight percent aluminum. The addition of small amounts of the indicated modifiers, such as chromium, to the basic nickel aluminide does not alter the intermetallic character of the nickel aluminide. Any additions to the nickel aluminide are limited by the constraint that the intermetallic character may not be lost through the addition.

The nickel aluminide intermetallic compound is preferably formed by pack cementation. An acceptable approach is disclosed in U.S. Pat. Nos. 3,415,672 and 3,540,878, whose disclosures are incorporated herein by reference. Briefly, as such a process is practiced in relation to the present invention, the cleaned substrate is packed in a bed of a mixture of an inert powder, such as aluminum oxide ($Al_2O_3$), an aluminum source alloy such as described in the '878 patent, and an activator such as ammonium chloride ($NH_4Cl$) or ammonium fluoride ($NH_4F$). A preferred source alloy has a composition of 50 to 70 weight percent titanium, 20–48 weight percent aluminum, and 0.5–9 weight percent carbon. The bed and substrate are heated to a temperature in excess of 1800° F. for a time that is typically about 240 minutes or more, so that aluminum diffuses from the packed bed into the metallic bond coat and substrate. In a more specific example, a superalloy piece packed in a powder blend consisting of 3 weight percent of the source alloy powder, 0.1 weight percent ammonium fluoride, balance aluminum oxide is heated in a controlled hydrogen atmosphere for 240 minutes at 1975° F. to produce a desirable nickel aluminide intermetallic coating. Any other operable approach for forming the nickel aluminide is acceptable, such as chemical vapor deposition.

One important reason for applying the nickel aluminide layer 30 is that its upper surface may be oxidized to form the aluminum oxide layer 32. The layer 32 is highly adherent and forms an excellent barrier against the penetration of oxygen or corrosive agents to the surface of the substrate 22 during service of the finished article. The preferred oxidizing atmosphere is air at a pressure of $5 \times 10^{-5}$ Torr. A period of up to 10 minutes exposure of the substrate, previously coated with the bond coat and the nickel aluminide, at a temperature of about 1800° F. in air, is sufficient to oxidize the surface of the layer 30 to a thickness of about $10^{-7}$ to $10^{-5}$ inches, the preferred thickness.

After either of these variations of applying a nickel aluminide layer 30 over the bond coat 24, or applying a nickel aluminide layer 30 over the bond coat 24 and then partially oxidizing the layer 30 to produce the aluminum oxide layer 32 is used, the ceramic topcoat 26 is then deposited over the nickel aluminide layer 30 or the aluminum oxide layer 32, respectively, using the same approach as described previously.

The following examples are intended to illustrate aspects of the invention, and should not be taken as limiting of the invention in any respect.

EXAMPLE 1

Disk specimens 0.13 inches thick by 1 inch diameter were machined from cast substrates of Rene 80 alloy and Rene N4 alloy, having a nominal composition of 7.5 weight percent cobalt, 9.75 weight percent chromium, 4.2 weight percent aluminum, 4.8 weight percent tantalum, 1.5 weight percent molybdenum, 6 weight percent tungsten, 3.45 weight percent titanium, 0.15 weight percent hafnium, 0.06 weight percent carbon, 0.004 weight percent boron, and the balance nickel. The Rene N4 was cast as a monocrystalline slab, and the specimens were machined so that the faces were parallel to the [001] orientation. The Rene 80 specimens were cut from polycrystalline rod.

Bond coats were applied to one side of each specimen, to a thickness of about 0.005 inches, by vacuum plasma spraying of powders of the proper compositions that were screened to −200/+325 mesh size. Four bond coats were utilized, having the following names and compositions: NiCrAlY, having a composition of 22 weight percent chromium, 10 weight percent aluminum, 0.3 weight percent yttrium, balance nickel; NiCoCrAlY, having a composition of 32 weight percent cobalt, 20 weight percent chromium, 8 weight percent aluminum, 0.3 weight percent yttrium, and the balance nickel; PS6MY; and NC6'. Of these bond coating materials, the NiCrAlY and NiCoCrAlY alloys are not within the scope of the invention, as they are not hardenable by the gamma/gamma prime reaction. The PS6MY and NC6' alloys are hardenable, and are therefore suitable for use with the invention. Some of the samples were provided the optional nickel aluminide intermetallic compound layer about 0.002 inches thick by pack cementation, using the method discussed earlier. In the results discussed below these samples are denoted by the above designations with the addition "+Al". The ceramic top coatings of zirconium oxide plus 8 weight percent yttrium oxide were deposited by air plasma spraying of −200/+325 mesh powder, to a thickness of about 0.010 inches. The coated substrates were heat treated at a temperature of 1975° F. for 4 hours to harden the bond coat.

Specimens of various treatments were subjected to thermal cycle spallation testing in air. The specimens were placed in a rack and heated in a furnace in a cycle consisting of a 10 minute heating from 390° F. to the indicated test temperature, holding at the test temperature for 45 minutes, and cooling to 390° F. in 10 minutes. The rack accommodated 60 specimens, and their positions were rotated at each inspection (every 20 cycles) to assure similar thermal treatment.

The results are summarized in the following Table I, which gives the number of cycles to failure, where failure is defined as the loss of 10 percent of the area of the original coating. The results reported for Rene N4 substrates are the average of 3 specimens for each testing condition, and the results reported for Rene 80 substrates are the average of 2 specimens for each testing condition.

TABLE 1

| Specimen Code | Substrate | Test Temperature, °F. | | |
|---|---|---|---|---|
| | | 2150 | 2075 | 2000 |
| NiCrAlY | Rene N4 | 52 | 160 | 467 |
| NiCrAlY + Al | Rene N4 | 73 | 213 | 440 |
| NiCoCrAlY + Al | Rene N4 | 62 | 180 | 387 |
| PS6MY + Al | Rene N4 | 200 | 600 | 1520 |
| NC6' | Rene 80 | — | 170 | — |
| NC6' + Al | Rene 80 | — | 210 | — |
| PS6MY | Rene 80 | — | 20 | — |
| PS6MY + Al | Rene 80 | — | 270 | — |

In Table 1, double dashes (--) mean that no test was performed.

As demonstrated by the results of Table 1, bond coats using the hardenable alloy PS6MY, with the nickel aluminide intermetallic layer, provide the best results on both the monocrystalline and the polycrystalline substrates, by a significant margin as compared with the non-hardening bond coats. When the nickel aluminide layer is omitted, the performance of the thermal barrier system is substantially reduced.

EXAMPLE 2

To assess the effect of heat treatment and the resulting creep strength of the bond coat on thermal cycling properties, Rene N4 substrates were prepared as in Example 1, coated with PS6MY bond coat as described in Example 1, given various heat treatments, coated with nickel aluminide and a ceramic top coat, and tested in the manner described in Example 1. These specimens were coated with the optional nickel aluminide intermetallic layer about 0.002 inch thick by pack cementation. The top coat of zirconium oxide and 8 percent yttrium oxide was plasma sprayed to a thickness of 0.014 inches. The specimens were tested in the cyclic oxidation apparatus and with the procedure described in Example 1, with a maximum temperature of 2075° F. The number of cycles to failure (average of three specimens for each treatment), as a function of the heat treatment after application of the thermal barrier coating system, is as follows: No heat treatment, 213 cycles; 4 hours at 1975° F., 300 cycles; 2 hours at 2100° F., 347 cycles; 2 hours at 2200° F., 373 cycles; 2 hours at 2300° F., 100 cycles.

Heat treatment of the samples results in significantly improved resistance to spalling failure, for those specimens heat treated at a temperature of less than 2300° F. The use of the heat treatable bond coating of the invention can significantly improve the thermal cycling oxidation resistance of the specimens.

Thus, the present approach provides an advancement in the protection of superalloy substrates, and more particularly nickel-based superalloy substrates by thermal barrier coating systems. Although the present invention has been described in connection with specific examples and embodiments, it will be understood by those skilled in the arts involved, that the present invention is capable of modification without departing from its spirit and scope as represented by the appended claims.

What is claimed is:

1. A superalloy article having a thermal barrier coating thereon, comprising:

a substrate made of a first superalloy; and a thermal barrier coating on the substrate, the thermal barrier coating including
a metallic bond coat upon the substrate, the bond coat being a layer of a nickel-base superalloy that is hardened by gamma/gamma prime precipitation, and
a ceramic topcoat upon the bond coat.

2. The article of claim 1, wherein the first superalloy is a nickel-based superalloy and the second superalloy contains from about 5 to about 7 weight percent aluminum.

3. The article of claim 1, wherein the metallic bond coat is selected from the group consisting of the alloy PS6MY, having a composition of 9 weight percent chromium, 6 weight percent aluminum, 4 weight percent cobalt, 1.5 weight percent molybdenum, 5 weight percent tantalum, 4.5 weight percent tungsten, 1.5 weight percent rhenium, 0.9 weight percent hafnium, 0.3 weight percent yttrium, 0.05 weight percent carbon, 0.015 weight percent boron, balance nickel, and the alloy NC6', having a composition of 10 weight percent cobalt, 18 weight percent chromium, 6.5 weight percent aluminum, 0.3 weight percent yttrium, 6 weight percent tantalum, 2 weight percent rhenium, 0.5 weight percent hafnium, 1 weight percent silicon, 0.015 weight percent zirconium, 0.015 weight percent boron, balance nickel.

4. The article of claim 1, wherein the metallic bond coat is from about 0.001 to about 0.005 inches thick.

5. The article of claim 1, wherein the upper surface of the metallic bond coat has an average surface roughness of at least about 400 microinches.

6. The article of claim 1, wherein the thermal barrier coating further includes
a layer of a nickel aluminide intermetallic compound between the metallic bond coat and the ceramic top coat.

7. The article of claim 6, wherein the thermal barrier coating further includes
a layer of aluminum oxide between the layer of nickel aluminide intermetallic compound and the ceramic topcoat.

8. The article of claim 6, wherein the nickel and aluminum are present in the nickel aluminide intermetallic compound in substantially equal atomic percentages.

9. The article of claim 6, wherein the layer of nickel aluminide intermetallic compound is from about 0.001 to about 0.003 inches thick.

10. The article of claim 1, wherein the ceramic topcoat has an equiaxed grain structure.

11. The article of claim 1, wherein the ceramic topcoat is about 0.010 inches thick.

12. The article of claim 1, wherein the ceramic topcoat includes zirconium oxide and a modifier selected from the group consisting of yttrium oxide and cerium oxide.

13. The article of claim 1, wherein the ceramic topcoat has a composition of zirconium oxide with about 8 percent by weight of yttrium oxide.

14. The article of claim 1, wherein the superalloy article is a gas turbine blade.

15. A superalloy article having a thermal barrier coating thereon, comprising:
a substrate made of a nickel-based superalloy, and
a thermal barrier coating on the substrate, the thermal barrier coating including
a metallic bond coat overlying the substrate, the bond coat being a gamma/gamma prime precipitation hardened nickel based superalloy with a thickness of from about 0.001 to about 0.005 inches thick, and having an upper surface that has an average surface roughness of at least about 0.0004 inches,
a layer of a nickel aluminide intermetallic compound overlying the bond coat and having a thickness of from about 0.001 to about 0.003 inches, and
a ceramic topcoat overlying the layer of nickel aluminide intermetallic compound.

16. The article of claim 15, wherein the metallic bond coat is hardened.

17. The article of claim 15, further including
a layer of aluminum oxide between the layer of nickel aluminide intermetallic compound and the ceramic topcoat.

18. The article of claim 17, wherein the aluminum oxide layer is from about $10^{-7}$ to about $10^{-5}$ inches thick.

19. A superalloy article having a thermal barrier coating thereon, comprising:
a substrate made of a nickel-based superalloy; and
a thermal barrier coating on the substrate, the thermal barrier coating including
a metallic bond coat overlying the substrate, the bond coat being a heat treated nickel based superalloy selected from the group consisting of PS6MY, having a composition of 9 weight percent chromium, 6 weight percent aluminum, 4 weight percent cobalt, 1.5 weight percent molybdenum, 5 weight percent tantalum, 4.5 weight percent tungsten, 1.5 weight percent rhenium, 0.9 weight percent hafnium, 0.3 weight percent yttrium, 0.05 weight percent carbon, 0.015 weight percent boron, balance nickel, and NC6', having a composition of 10 weight percent cobalt, 18 weight percent chromium, 6.5 weight percent aluminum, 0.3 weight percent yttrium, 6 weight percent tantalum, 2 weight percent rhenium, 0.5 weight percent hafnium, 1 weight percent silicon, 0.015 weight percent zirconium, 0.015 weight percent boron, balance nickel, and having a thickness of from about 0.001 to about 0.005 inches thick, and having an upper surface that has an average surface roughness of at least about 0.0004 inches,
a layer of a nickel aluminide intermetallic compound overlying the bond coat and having a thickness of from about 0.001 to about 0.003 inches, and
a ceramic topcoat overlying the layer of nickel aluminide intermetallic compound, the ceramic topcoat having a composition of zirconium oxide plus from about 6 to about 20 weight percent yttrium oxide and a thickness of about 0.010 inches.

20. A process for preparing a superalloy article having a thermal barrier coating thereon, comprising:
furnishing a substrate made of a first superalloy;
depositing upon the substrate a bond coat of a heat treatable second superalloy, the second superalloy being a gamma/gamma prime hardenable superalloy;
heat treating the substrate and bond coat to effect precipitation of strengthening precipitates in the bond coat by the gamma/gamma prime reaction; and
depositing a ceramic topcoat overlying the bond coat.

21. The process of claim 20, including the additional step, after the step of depositing a bond coat and before the step of depositing a ceramic topcoat, of
depositing upon the surface of the bond coat a layer of a nickel aluminide intermetallic compound.

22. The process of claim 21, including the additional step, after the step of depositing a layer of nickel aluminide intermetallic compound and before the step of depositing a ceramic topcoat, of oxidizing the surface of the nickel aluminide layer to form an aluminum oxide layer.

23. The process of claim 20, including the additional step of heat treating the article to harden the bond coat.

24. A process for depositing a thermal barrier coating on a metallic substrate, comprising:

depositing upon a substrate a bond coat of a heat treatable second superalloy, the second superalloy being a gamma/gamma prime hardenable superalloy;

heat treating the substrate and bond coat to effect precipitation of strengthening precipitates in the bond coat by the gamma/gamma prime reaction; and depositing a ceramic topcoat overlying the bond coat.

25. A thermal barrier coating system applied over a metallic substrate, comprising:

a hardenable metallic bond coat applied upon the metallic substrate that is heat treated by gamma/gamma prime precipitation; and a ceramic topcoat applied upon the bond coat.

26. The thermal barrier coating system of claim 25, wherein the metallic bond coat is a superalloy.

27. The thermal barrier coating system of claim 26, wherein the superalloy is a nickel-based superalloy.

* * * * *